(12) United States Patent
Brown

(10) Patent No.: US 7,913,060 B2
(45) Date of Patent: Mar. 22, 2011

(54) METHOD AND APPARATUS FOR PHYSICAL WIDTH EXPANSION OF A LONGEST PREFIX MATCH LOOKUP TABLE

(75) Inventor: David A. Brown, Carp (CA)

(73) Assignee: SAtech Group, A.B. Limited Liability Company, Wilmington, DE (US)

( * ) Notice: Subject to any disclaimer, the term of this patent is extended or adjusted under 35 U.S.C. 154(b) by 1236 days.

(21) Appl. No.: 11/099,724

(22) Filed: Apr. 6, 2005

(65) Prior Publication Data

US 2005/0175005 A1  Aug. 11, 2005

Related U.S. Application Data

(63) Continuation of application No. 09/886,650, filed on Jun. 21, 2001, now Pat. No. 6,880,064.

(60) Provisional application No. 60/212,966, filed on Jun. 21, 2000, provisional application No. 60/258,436, filed on Dec. 27, 2000, provisional application No. 60/294,387, filed on May 30, 2001.

(51) Int. Cl.
*G06F 12/00* (2006.01)

(52) U.S. Cl. . 711/216; 711/206; 711/221; 711/E12.014; 711/E12.06; 370/395.32; 370/395.31

(58) Field of Classification Search .................. None
See application file for complete search history.

(56) References Cited

U.S. PATENT DOCUMENTS

| | | |
|---|---|---|
| 3,716,840 A | 2/1973 | Masten |
| 4,450,525 A | 5/1984 | Demuth et al. |
| 4,661,658 A | 4/1987 | Matyas |
| 5,202,986 A | 4/1993 | Nickel |
| 5,329,618 A | 7/1994 | Moati et al. |
| 5,359,724 A | 10/1994 | Earle |
| 5,384,568 A | 1/1995 | Grinberg et al. |
| 5,386,413 A | 1/1995 | McAuley et al. |
| 5,438,535 A | 8/1995 | Lattibeaudiere |
| 5,459,717 A | 10/1995 | Mullan et al. |
| 5,479,401 A | 12/1995 | Bitz et al. |

(Continued)

FOREIGN PATENT DOCUMENTS

EP  0453707 A  10/1991

(Continued)

OTHER PUBLICATIONS

Degermark Mikael et al., "Small Forwarding Tables for Fast Routing Lookups", Department of Computer Science and Electrical Engineering, Luleå University of Technology, Sweden, *SigComm '97 Cannes, France* pp. 3-14 (1997).

(Continued)

*Primary Examiner* — Shawn X Gu

(57) ABSTRACT

A lookup unit matrix combines a plurality of lookup units to provide a longest prefix match for a search key longer than the lookup unit's mapper key. A portion of the search key is provided to each of the plurality of lookup units in a single search request issued to the lookup unit matrix. Each lookup unit in the lookup unit matrix performs a multi-level search for the result value based on the portion of the search key forwarded as the mapper key and the result of a multilevel search in the previous lookup unit. The search results in a value corresponding to the search key stored in a single location in one of the lookup units.

18 Claims, 8 Drawing Sheets

U.S. PATENT DOCUMENTS

| | | | |
|---|---|---|---|
| 5,561,786 | A | 10/1996 | Morse |
| 5,680,161 | A | 10/1997 | Lehman et al. |
| 5,727,051 | A | 3/1998 | Holender |
| 5,787,151 | A | 7/1998 | Nakatsu et al. |
| 5,857,196 | A | 1/1999 | Angle et al. |
| 5,930,805 | A | 7/1999 | Marquis |
| 5,946,679 | A | 8/1999 | Ahuja |
| 6,011,795 | A | 1/2000 | Varghese |
| 6,014,659 | A | 1/2000 | Wilkinson |
| 6,034,958 | A | 3/2000 | Wicklund |
| 6,067,574 | A | 5/2000 | Tzeng |
| 6,085,188 | A | 7/2000 | Bachmann et al. |
| 6,141,655 | A | 10/2000 | Johnson et al. |
| 6,161,144 | A | 12/2000 | Michels |
| 6,189,143 | B1 | 2/2001 | Simonyi |
| 6,192,051 | B1 | 2/2001 | Lipman |
| 6,199,100 | B1 | 3/2001 | Filepp |
| 6,223,172 | B1 | 4/2001 | Hunter |
| 6,226,710 | B1 | 5/2001 | Melchior |
| 6,247,014 | B1 | 6/2001 | Ladwig et al. |
| 6,266,706 | B1 | 7/2001 | Brodnik |
| 6,285,994 | B1 | 9/2001 | Bui |
| 6,338,079 | B1 | 1/2002 | Kanamori et al. |
| 6,385,649 | B1 | 5/2002 | Draves et al. |
| 6,430,527 | B1 | 8/2002 | Waters |
| 6,434,144 | B1 * | 8/2002 | Romanov .................... 370/392 |
| 6,452,908 | B1 | 9/2002 | Yamada et al. |
| 6,460,112 | B1 | 10/2002 | Srinivasan |
| 6,490,592 | B1 | 12/2002 | St. Denis et al. |
| 6,512,766 | B2 | 1/2003 | Wilford |
| 6,513,028 | B1 | 1/2003 | Lee |
| 6,522,632 | B1 | 2/2003 | Waters |
| 6,526,055 | B1 | 2/2003 | Perlman et al. |
| 6,539,369 | B2 | 3/2003 | Brown |
| 6,539,455 | B1 | 3/2003 | Khanna |
| 6,553,002 | B1 | 4/2003 | Bremer |
| 6,563,823 | B1 | 5/2003 | Przygienda et al. |
| 6,570,866 | B1 | 5/2003 | Murase et al. |
| 6,571,313 | B1 | 5/2003 | Filippi |
| 6,658,482 | B1 | 12/2003 | Chen et al. |
| 6,675,163 | B1 | 1/2004 | Bass |
| 6,687,247 | B1 | 2/2004 | Wilford et al. |
| 6,691,218 | B2 | 2/2004 | Brown |
| 6,711,153 | B1 | 3/2004 | Hebb et al. |
| 6,744,775 | B1 | 6/2004 | Beshai et al. |
| 6,754,799 | B2 | 6/2004 | Frank |
| 6,778,530 | B1 | 8/2004 | Greene |
| 6,782,282 | B2 | 8/2004 | Bielefeldt et al. |
| 6,782,382 | B2 | 8/2004 | Lunteren |
| 6,826,561 | B2 | 11/2004 | Cao |
| 6,836,771 | B2 | 12/2004 | Brown |
| 6,839,825 | B1 | 1/2005 | Brown |
| 6,873,982 | B1 | 3/2005 | Bates |
| 6,877,005 | B2 | 4/2005 | Hunter |
| 6,880,064 | B1 * | 4/2005 | Brown .................... 711/216 |
| 6,917,954 | B2 | 7/2005 | Ahmad et al. |
| 6,956,858 | B2 | 10/2005 | Hariguchi et al. |
| 7,023,807 | B2 | 4/2006 | Michels |
| 7,106,732 | B2 | 9/2006 | Brown |
| 7,423,981 | B2 | 9/2008 | Brown |
| 7,715,385 | B2 | 5/2010 | Brown |
| 2001/0042130 | A1 | 11/2001 | Brown |
| 2001/0056417 | A1 | 12/2001 | Cao et al. |
| 2002/0059197 | A1 | 5/2002 | Hunter et al. |
| 2002/0080798 | A1 | 6/2002 | Hariguchi et al. |
| 2005/0175005 | A1 | 8/2005 | Brown |

FOREIGN PATENT DOCUMENTS

| | | |
|---|---|---|
| JP | 10-257066 | 9/1998 |
| JP | 11-191781 | 7/1999 |
| JP | 2000-151691 A | 5/2000 |
| JP | 2001-517024 | 10/2001 |
| JP | 2005-022297 A | 1/2005 |
| WO | WO 99/13619 | 3/1999 |
| WO | WO 99/14606 | 3/1999 |
| WO | WO 99/14906 | 3/1999 |
| WO | WO 01/10097 A2 | 2/2001 |

OTHER PUBLICATIONS

Ruiz-Sanchez, M.A., et al., "XP002901792 Survey and Taxonomy of IP Address Lookup Algorithms," *IEEE Network*, (Mar./Apr. 2001), 16 pages.

Hariguchi, Network Routing Table, Jun. 30, 2000, U.S. Appl. No. 60/215,653, pp. 1-52, Figs. 1-23 and Appendixes 1-2, 93 pages.

Office Action in JP Patent Application 2001-542955, mailed May 11, 2010, 5 pages.

Response to May 11, 2010 Office Action in JP Patent Application 2001-542955, dated Aug. 22, 2010, 10 pages.

International Search Report for PCT/CA2000/01442 mailed Jul. 12, 2001, 5 pages.

Written Opinion for PCT/CA2000/01442 mailed Jan. 21, 2002, 2 pages.

Reply to Written Opinion for PCT/CA2000/01442; dated Mar. 14, 2002, 12 pages.

International Preliminary Examination Report for PCT/CA2000/01442 mailed Apr. 16, 2002, 6 pages.

Notice of Allowance for U.S. Appl. No. 09/733,627 mailed Sep. 26, 2003, 6 pages.

Office Action in U.S. Appl. No. 09/886,659 mailed Nov. 23, 2004, 10 pages.

Response to Nov. 23, 2004 Office Action in U.S. Appl. No. 09/886,659, dated Apr. 25, 2005, 14 pages.

Final Rejection in U.S. Appl. No. 09/886,659 mailed Jul. 13, 2005, 7 pages.

Response to Jul. 13, 2005 Final Rejection in U.S. Appl. No. 09/886,659, dated Nov. 14, 2005, 8 pages.

Advisory Action for U.S. Appl. No. 09/886,659 mailed Dec. 8, 2005, 3 pages.

Notice of Appeal filed for U.S. Appl. No. 09/886,659, dated Dec. 13, 2005, 3 pages.

Request for Continued Examination filed for U.S. Appl. No. 09/886,659, dated Apr. 13, 2006, 5 pages.

Office Action in U.S. Appl. No. 09/886,659 mailed Aug. 14, 2006, 10 pages.

Response to Aug. 14, 2006 Office Action in U.S. Appl. No. 09/886,659, dated Dec. 14, 2006, 11 pages.

Examiner Interview Summary Record, U.S. Appl. No. 09/886,659, mailed Dec. 28, 2006, 4 pages.

Final Rejection in U.S. Appl. No. 09/886,659, mailed Jul. 16, 2008, 8 pages.

Request for Continued Examination filed for U.S. Appl. No. 09/886,659, dated Oct. 16, 2008, 14 pages.

Office Action in U.S. Appl. No. 09/886,659 mailed Jan. 6, 2009, 9 pages.

Response to Jan. 6, 2009 Office Action in U.S. Appl. No. 09/886,659, dated Jun. 6, 2009, 10 pages.

Final Rejection in U.S. Appl. No. 09/886,659 mailed Oct. 2, 2009, 10 pages.

Response to Oct. 2, 2009 Final Rejection in U.S. Appl. No. 09/886,659, dated Dec. 2, 2009, 11 pages.

Notice of Allowance for U.S. Appl. No. 09/886,659 mailed Mar. 8, 2010, 8 pages.

Request for Continued Examination filed for U.S. Appl. No. 09/886,659, dated Jun. 7, 2010, 2 pages.

Office Action in U.S. Appl. No. 09/886,659 mailed Jun. 22, 2010, 7 pages.

Notice of Allowance for U.S. Appl. No. 09/886,650 mailed Dec. 3, 2004, 6 pages.

U.S. Appl. No. 09/886,648 filed Jun. 21, 2001.

U.S. Appl. No. 09/886,659 filed Jun. 21, 2001.

U.S. Appl. No. 09/733,628 filed Dec. 8, 2000.

International Search Report for PCT/CA2000/01441 mailed Jul. 12, 2001, 5 pages.

Written Opinion for PCT/CA2000/01441, mailed Jan. 21, 2002, 2 pages.

Reply to Written Opinion for PCT/CA2000/01441; dated Mar. 14, 2002, 13 pages.

International Preliminary Examination Report for PCT/CA2000/01441 mailed Apr. 15, 2002, 7 pages.

International Search Report for PCT/CA2000/01444 mailed Jul. 13, 2001, 4 pages.
Written Opinion for PCT/CA2000/01444 mailed Jan. 21, 2002, 2 pages.
Reply to Written Opinion for PCT/CA2000/01444; dated Mar. 21, 2002, 10 pages.
International Preliminary Examination Report for PCT/CA2000/01444 mailed Apr. 23, 2002, 6 pages.
International Search Report for PCT/CA2000/01443 mailed Jul. 12, 2001, 4 pages.
International Preliminary Examination Report for PCT/CA2000/01443 mailed Jan. 21, 2002, 3 pages.
International Search Report for PCT/CA2002/00786 mailed Mar. 13, 2003, 5 pages.
Written Opinion for PCT/CA2002/00786 mailed Oct. 20, 2003, 3 pages.
International Preliminary Examination Report for PCT/CA2002/000786, dated Dec. 30, 2003, 6 pages.
Petition for Revival and Rescission of Previous Nonpublication Request, U.S. Appl. No. 09/886,659, dated Oct. 12, 2010, 5 pages.
Response to Office Action, U.S. Appl. No. 09/886,659, dated Oct. 21, 2010, 11 pages.
Gupta, P., et al., "Routing Lookups in Hardware at Memory Access Speeds," INFOCOM '98, IEEE, Mar./Apr. 1998, 9 pages.
Hayashi, Tsunemasa, et al., Table Search Engine for Telecommunications, IEICE Technical Report, vol. 98, No. 572, pp. 65-72, Jan. 29, 1999, 11 pages.
Yu, D., et al., "XP-001016965 Forwarding Engine for Fast Routing Lookups and Updates," IEEE, Dec. 1999, 10 pages.
Decision of Rejection in JP Patent Application 2001-542955, dated Nov. 25, 2010, 4 pages.
Notice of Allowance for U.S. Appl. No. 09/886,659 mailed Jan. 6, 2011, 15 pages.

* cited by examiner

“METHOD AND APPARATUS FOR PHYSICAL WIDTH EXPANSION OF A LONGEST PREFIX MATCH LOOKUP TABLE”

RELATED APPLICATIONS

This application is a continuation of U.S. application Ser. No. 09/886,650, filed Jun. 21, 2001, which issued on Apr. 12, 2005 as U.S. Pat. No. 6,880,064, and which claims the benefit of U.S. Provisional Application Nos. 60/212,966 filed on Jun. 21, 2000, 60/258,436 filed on Dec. 27, 2000, and 60/294,387 filed on May 30, 2001. The entire teachings of the above applications are incorporated herein by reference.

BACKGROUND OF THE INVENTION

The Internet is a set of networks connected by routers. A router maintains a routing table that indicates for each possible destination network, the next hop to which a received data packet should be forwarded. The next hop may be another router or the final destination.

An Internet Protocol ("IP") data packet received at a port in a router includes an IP destination address. The IP destination address is the final destination of the IP data packet. Currently there are two versions of IP, IP version 4 ("IPv4") and IP version 6 ("IPv6"). IPv4 provides a 32-bit field in an IP header included in the data packet for storing the IP destination address. The router forwards a received data packet to a next-loop router or the final destination if the destination is the local network, dependent on the IP destination address stored in the IP header.

A 32-bit IPv4 destination address provides 4 billion possible routes or destinations. An Internet router typically stores a next hop for 50,000 of the 4 billion possible destinations. However, the number of stored routes will increase with the growth of the Internet and the widespread use of IPv6.

Originally, the IP address space was divided into three classes of IP addresses; A, B and C. Each IP address space was divided into a network address and a host address. Class A allowed for 126 networks and 16 million hosts per network. Class B allowed for 16382 networks with 64,000 hosts per network and class C allowed for 2 million networks with 256 hosts per network. However, dividing the IP address space into different classes reduced the number of available IP addresses. Class C only allowed a maximum of 256 hosts per network which is too small for most organizations. Therefore, most organizations were assigned a Class B address, taking up 64,000 host addresses which could not be used by other organizations even if they were not used by the organization to which they were assigned. Hosts in an organization with a Class B IP address all use the same network address in the 16 Most Significant Bits ("MSBs"), for example, 128.32.xx.xx.

Classless InterDomain Routing ("CIDR") was introduced to free up unused IP host addresses. The remaining unused networks are allocated to organization in variable sized blocks. An organization requiring 500 addresses gets 500 continuous addresses. For example, an organization can be assigned 500 available addresses starting at 128.32.xx. The number of routes stored by a router has increased since the introduction of Classless InterDomain Routing. Classless InterDomain Routing requires longest prefix matching to find the corresponding route instead of searching for a matching network address in order to find the corresponding next hop for the IP destination address. For example, a search can no longer stop after the 16 Most Significant Bits ("MSBs") of a Class B IP address, for example, 128.32.xx because 128.32.4.xx may be assigned to another organization requiring a different next hop.

One method for searching for a longest prefix match for a key is through the use of a binary tree search. A binary tree search matches a 32-bit input bit by bit down to 32 levels, requiring 32 searches to finding the entry matching the 32-bit key. Another method for searching for a match is through the use of a Patricia tree. A Patricia tree reduces the number of searches required if there are no entries down a leaf of the binary tree.

Yet another method for efficiently searching for a next hop associated with an IP destination address is described in PCT application Serial Number PCT/SE98/00854 entitled "Method and System for Fast Routing Lookups" by Brodnick et al. filed on May 11, 1998. The method described by Brodnick reduces the number of next hops stored by not storing duplicate routes. By reducing the number of next hops, the memory requirement is reduced so that a route lookup table can be stored in fast cache memory.

Brodnick et al. divides the binary tree into 3-levels. Dividing the binary tree into 3-levels reduces the number of searches to three. The indexed entry in the first level indicates whether the search can end at the first level with the route taken from the entry, or the search must continue to a subsequent level using a further portion of the IP destination address.

FIG. 1A illustrates a prior art 64K (65536) bit map representing the first level of a binary tree. A 64K bit map 30 represents the leaves or nodes 44 of the binary tree at depth 16, with one bit per node 44. The bit map is divided into bit-masks of length 16. There are $2^{12}=4096$ bit masks in the 64 k bit map. One bit mask is shown in FIG. 1A. A bit in the bit map 30 is set to '1' if there is a subtree or a route index stored in an array of pointers corresponding to the node 44. A bit in the bit map 30 is set to '0' if the node shares a route entry with a previous node 44.

FIG. 1B illustrates prior art lookup table implemented in cache memory. The lookup table includes an array of code words 36, an array of base indexes 34 and a map table 40. A 32-bit IP address 38 is also shown in FIG. 1B. A codeword 46 is stored in the array of code words 36 for each bit mask in the bit map 30 (FIG. 1A). The code word 46 includes a six-bit value 46a and a 10-bit offset 46b. A base index 42 is stored in the array of base indexes 34 for every four code words 46 in the array of code words 36.

The array of code words 36, array of base indexes 34 and map table 40 are used to select a pointer in an array of pointers (not shown). The pointer stores a route index or an index to perform a further search.

A group of pointers in the array of pointers is selected by selecting a code word 46 in the array of code words 36 and a base index 42 in the array of base indexes 34. The code word 46 is selected using the first 12 bits 50 of the IP address 38. The base index 42 is selected using the first 10 bits 48 of the IP address 38. The correct pointer in the group of pointers is selected using the map table 32.

The 10-bit value 46b in the selected code word 36 is an index into the map table 32. The map table 32 maps bit numbers within a bit-mask to 4-bit offsets. The offset specifies the pointer within the selected group of pointers in the array of pointers. The 10-bit value 46b selects the row in the map table 32 and bits 19:16 of the IP address 52 selects the 4-bit offset 54.

Thus, a search for a pointer requires the following cache memory accesses: (1) read a 16 bit code word 46; (2) read a 16-bit base address 42; (3) read a 4 bit offset 54 from the map table 32; (4) read a pointer at a pointer index where the pointer index is the sum of the base address 42, the code word offset 46a and the 4-bit offset 54.

The same memory accesses are required for each level of the binary tree. Thus, a search of three levels for a 32-bit IPv4 address requires 12 memory accesses. As many as forty-eight memory accesses can be required to perform a longest prefix search for a 128-bit IPv6 address.

SUMMARY OF THE INVENTION

U.S. patent application Ser. No. 09/733,627 entitled "Method and Apparatus for Longest Match Address Lookup," filed Dec. 8, 2000 by David A. Brown describes a lookup unit for performing multiple level searches with portions of a search key in successive mappers, entries in the mappers outputting route indexes or providing partial indexes to subsequent mappers. The length of the search key is limited by the number of search levels in the lookup units.

In accordance with the invention, a longest prefix match lookup matrix allows searching from longer search keys including search keys of different lengths such as the 32-bit IPv4 and 128 IPv6 addresses. A lookup matrix includes a master lookup unit and at least one non-master lookup unit. The master lookup unit and the non-master lookup unit include a plurality of mappers. The mappers in the master lookup unit are indexed by portions of a first portion of a search key to output a route index for the search key or partial indexes to subsequent mappers. The mappers in the non-master lookup unit are indexed by portions of a next portion of the search key and a partial index from a prior lookup unit to output the route index for the search key or another partial index to a subsequent non-master lookup unit.

The route index corresponding to the search key is stored in a single location in one of the lookup units. The length of the search key is variable and may be expanded by adding an additional non-master lookup unit. The search key may include a 32-bit IPv4 address or a 128 IPv6 address. If the search key includes a 32-bit IPv4 address, the route index corresponding to the search key is found after a first search of the plurality of mappers. The partial index may be a subtree index.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1A:
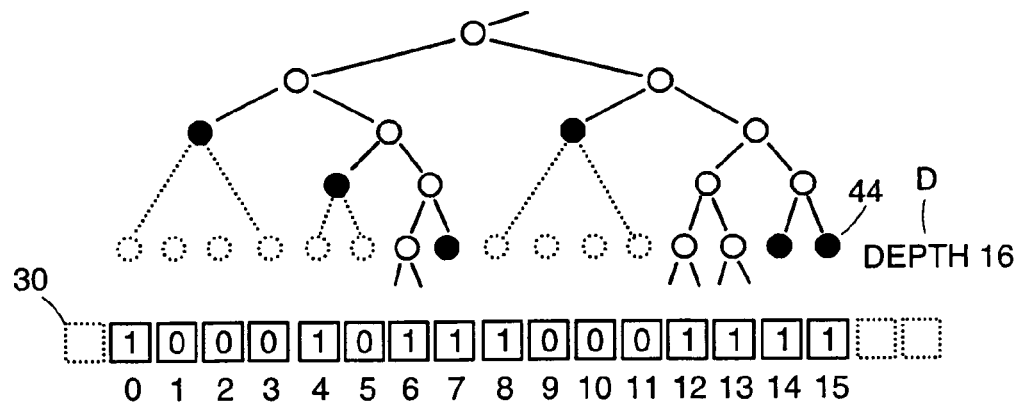
FIG. 1A illustrates a prior art bit map representing the first level of a binary tree.
Figure 1B:
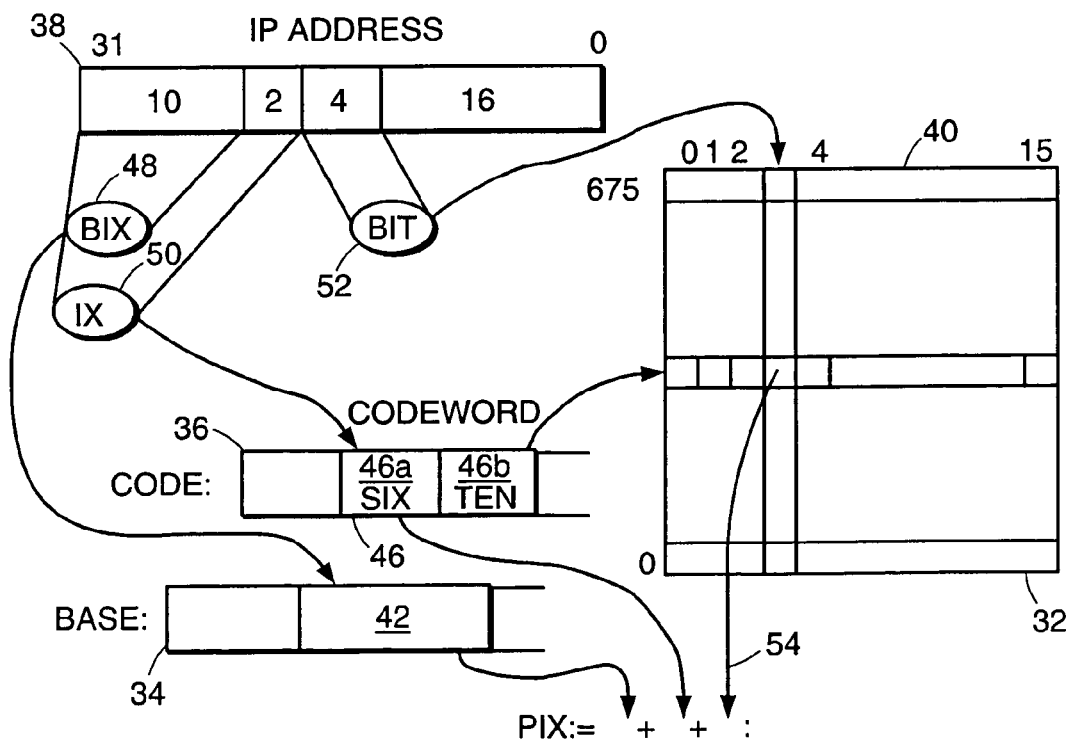
FIG. 1B illustrates a prior art lookup unit implemented in cache memory.
Figure 2:
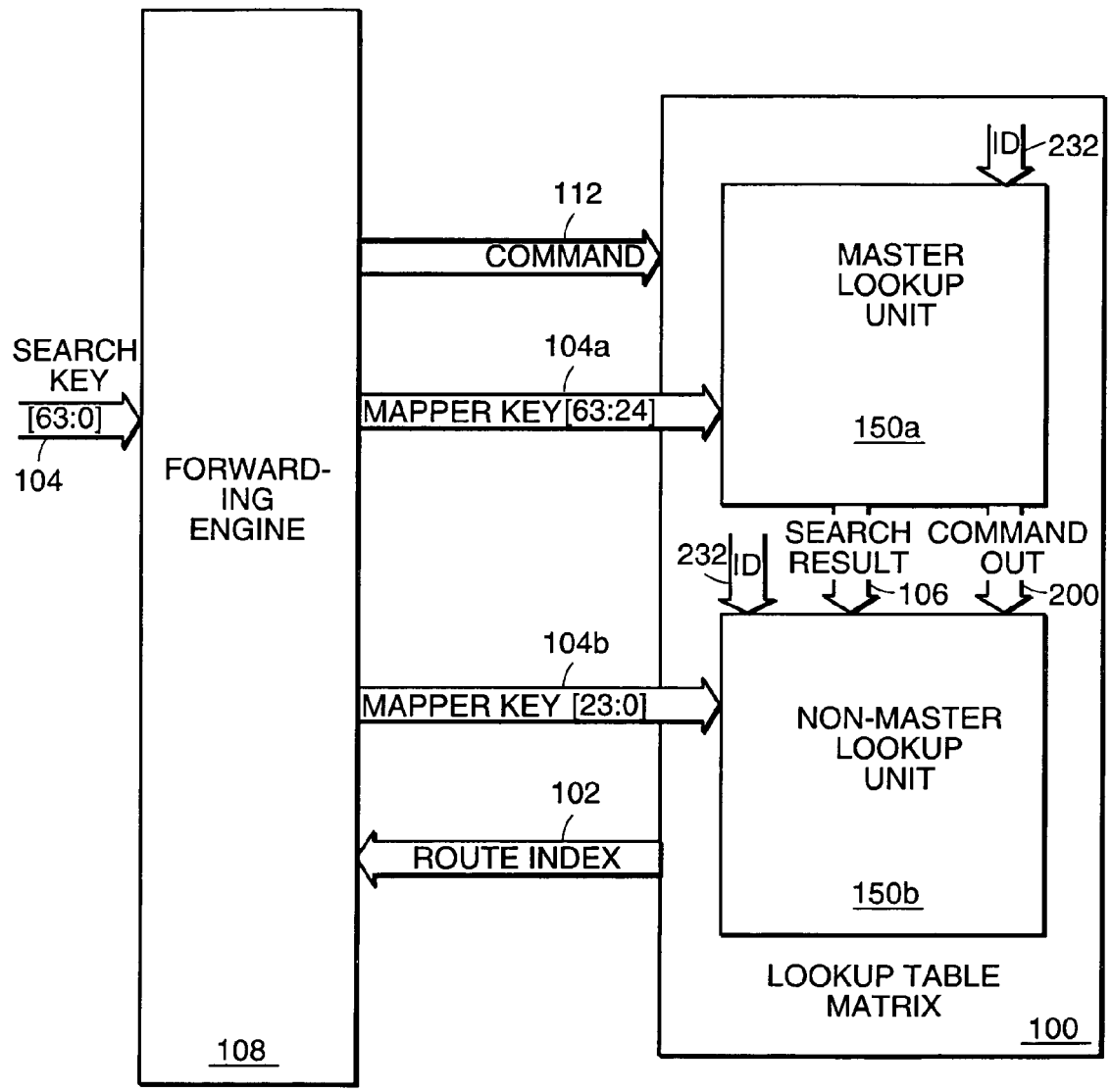
FIG. 2 illustrates a forwarding engine coupled to a lookup unit matrix according to the principles of the present invention.

FIG. 2 illustrates a forwarding engine 108 coupled to a longest prefix match lookup unit matrix 100 according to the principles of the present invention. The lookup unit matrix 100 includes a plurality of lookup units 150a, 150b. The lookup unit matrix 100 performs a multi-level search in one or more of the lookup units 150a, 150b for a value corresponding to a portion of the search key 104 forwarded as mapper keys 104a, 104b by the forwarding engine 108. A route index 102 for a search key 104 which may be longer than the lookup unit's mapper key is stored in a mapper entry in one of the lookup units 150a, 150b.

In one embodiment, the search key 104 is an Internet Protocol ("IP") address. The forwarding engine 108 and the lookup unit matrix 100 provide a route index 102 to a next hop or destination corresponding to the IP address. Well known standard IP addresses include the 32-bit IPv4 address and the 128-bit IPv6 address. A 40-bit mapper key 104a can include a 32-bit IPv4 address and an 8-bit prefix. The invention is described for an embodiment including two lookup units and a 64-bit search key. The search key can be expanded to a 128-bit IPv6 address by adding more lookup units. In the embodiment shown, a 64-bit search key longer than a 32-bit IPv4 address is input to the forwarding engine 108. The forwarding engine 108 divides the 64-bit search key into mapper keys 104a and 104b and forwards mapper keys 104a and 104b to the lookup unit matrix 100.

The lookup unit matrix 100 performs a multi-level search in master lookup unit 150a for a route index 102 corresponding to the first portion of the search key 104 forwarded as 40-bit mapper key 104a. If the search of master lookup unit 150a does not result in a route index 102 corresponding to the first 40-bits of the search key 104a, a subsequent search is performed in non-master lookup unit 150b for a value corresponding to the next 24-bits of the key 104b forwarded by the forwarding engine 108 and the search result 106 from master lookup unit 150a.

In the embodiment shown, the search key 104 is 64-bits long and the lookup unit matrix 100 includes two lookup units 150a, 150b. Master lookup unit 150a performs a search for a route index corresponding to the first 40-bits of the 64-bit search key 104. Non-master lookup unit 150b performs a search for a route index corresponding to the next 24-bits of the 64-bit search key 104 and the result of the search of master lookup unit 150a. The search key 104 can be expanded further by adding more non-master lookup units 150b to the lookup unit matrix 100. Each additional non-master lookup unit 150b expands the search key 104 by 24-bits.

The lookup unit matrix 100 can store route indexes for both IPv4 and IPv6 addresses. A single search cycle for the 32-bit IPv4 address results in a route index 102 corresponding the longest prefix match for the 32-bit IPv4 address stored in master lookup unit 150a in the lookup unit matrix 100. The resulting route index 102 is forwarded to the forwarding engine 108.

A 128-bit IPv6 address is longer than the 40-bit mapper key 104a. Thus, a search of master lookup unit 150a may not be sufficient. Typically, there are more route indexes for IPv4 addresses stored in a router than for IPv6 addresses. The length of the mapper key 104*a* is therefore selected such that a search for a route index 102 corresponding to an 8-bit prefix and a 32-bit IPv4 address can be performed in a single search of master lookup unit 150*a*. Thus, only infrequent searches for route indexes for longer search keys, such as 128-bit IPv6 addresses require searching multiple lookup units 150*a*, 150*b*.

A search of a lookup unit 150*a*, 150*b* is described in co-pending U.S. patent application Ser. No. 09/733,627 filed on Dec. 8, 2000 entitled "Method and Apparatus for Longest Match Address Lookup," by David A. Brown incorporated herein by reference in its entirety.

The search key is expanded by combining a plurality of lookup units. A single lookup unit stores routes for search keys less than or equal to the lookup unit's mapper key or a plurality of lookup units are combined to store routes corresponding to keys longer than the lookup unit's mapper key.

Each lookup unit 150*a*, 150*b* includes a device identifier 232 set at power up by pin straps. The state of the device identifier 232 determines whether the size of the mapper key for each lookup unit 150*a*, 150*b* is 40-bits or 24-bits. If the device identifier 232 identifies the lookup unit as the master lookup unit 150*a*, the mapper key 104*a* is 40-bits and the first level mapper search in the master lookup unit 150*a* starts with the 16 Most Significant Bits ("MSBs") of the search key 104. If the device identifier 232 identifies the lookup unit as a non-master lookup unit 150*b*, the mapper key 104*b* is the next 24-bits of the search key 104 and the second level mapper search in the non-master lookup unit 150*b* starts with the first 8-bits of mapper key 104*b* and the result of the search of lookup unit 150*a*.

In a search of the lookup unit matrix 100 for a route index 102 corresponding to the search key 104, the most significant 40-bits of the search key 104 are forwarded by the forwarding engine 108 to the lookup unit matrix 100 as mapper key 104*a* together with a "search" command on the command bus 112. A search is performed in master lookup unit 150*a* and non-master lookup unit 150*b*. The search in master lookup unit 150*a* begins in the first mapper level because the device identifier indicates that master lookup unit is a master lookup unit. The search in non-master lookup unit 150*b* begins in the second mapper level irrespective of the command received because there are no route indexes or partial indexes stored in the first level mapper in the non-master lookup unit 150*b*.

A lookup unit matrix 100 including eight lookup units 150 can store a route index 102 corresponding to a 208-bit key. The search is performed in the master lookup unit 150*a* for a route index or partial index corresponding to the first 40-bits of the search key 104 which are forwarded as mapper key 104*a* to the master lookup unit 150*a*. Seven subsequent searches are performed, if necessary, dependent on the result of the search of the previous lookup unit and the next 24-bits of the search key 104 in the next seven lookup units in the lookup table matrix 100. The search in the other seven lookup units begins in the second mapper level because the state of the device identifier 232 for each of the seven lookup units indicates that the lookup units are non-master lookup units.

In an alternate embodiment, lookup unit 150*b* can be configured to logically expand the second portion of the search key 104. For example, in the case of a 128-bit search key the 40-bit mapper key can be forwarded to the master lookup unit 150*a* and the remaining 88 bits of the 128-bit search key can be searched repeatedly by non-master lookup unit 150*b*, 24-bits at a time with the first 24-bits searched with the previous result of the search of master lookup unit 150*a*. A method and apparatus for logically expanding a search key is described in co-pending patent application 09/886,659, filed on even date herewith, entitled "Method and Apparatus for Logically Expanding A Search Key", by David A. Brown incorporated herein by reference in its entirety.

Figures 1, 3A:
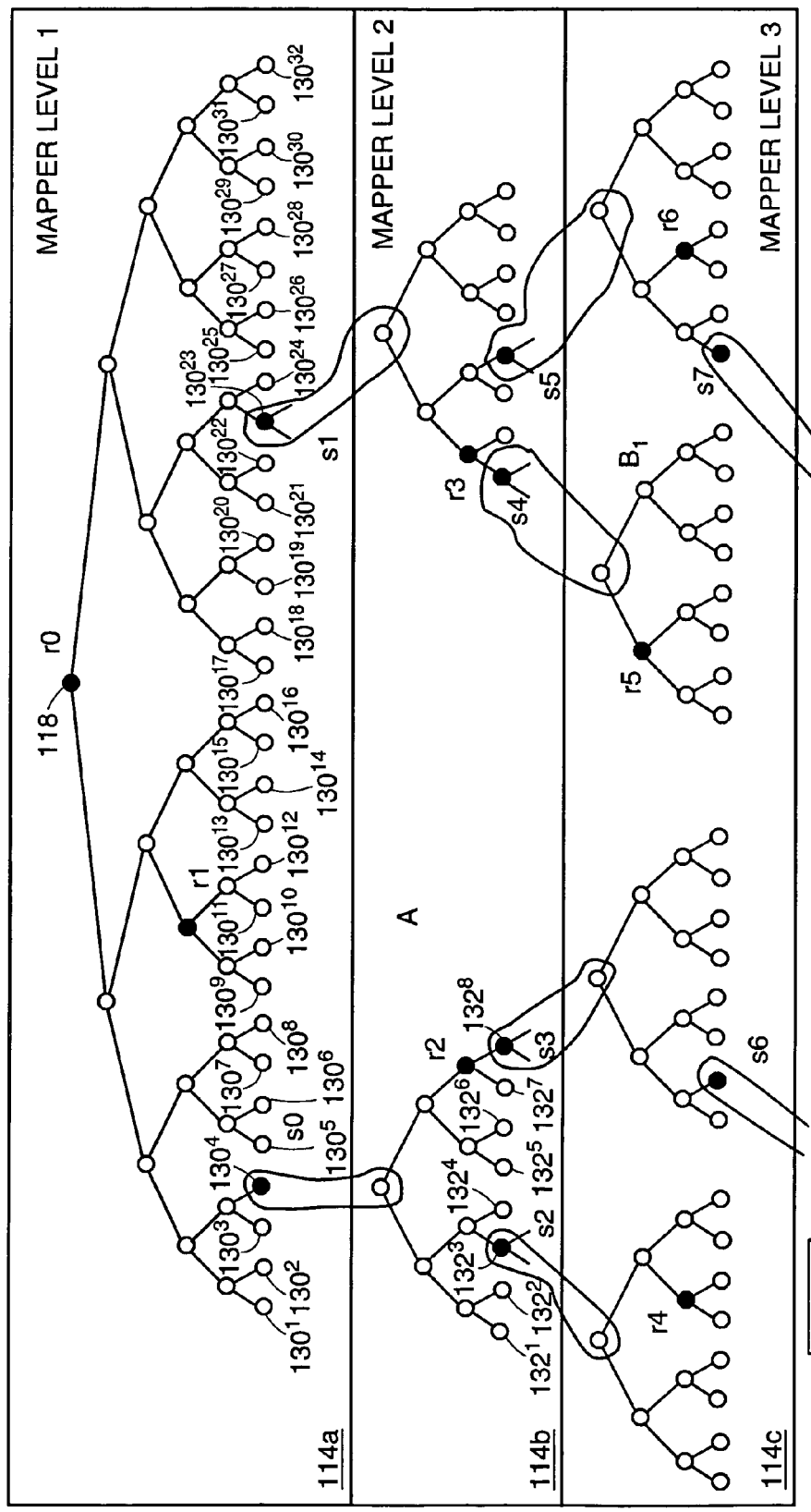
FIG. 3A illustrates a 64-level binary tree representation of entries stored in the lookup unit matrix shown in FIG. 2.
Figures 2, 3A:
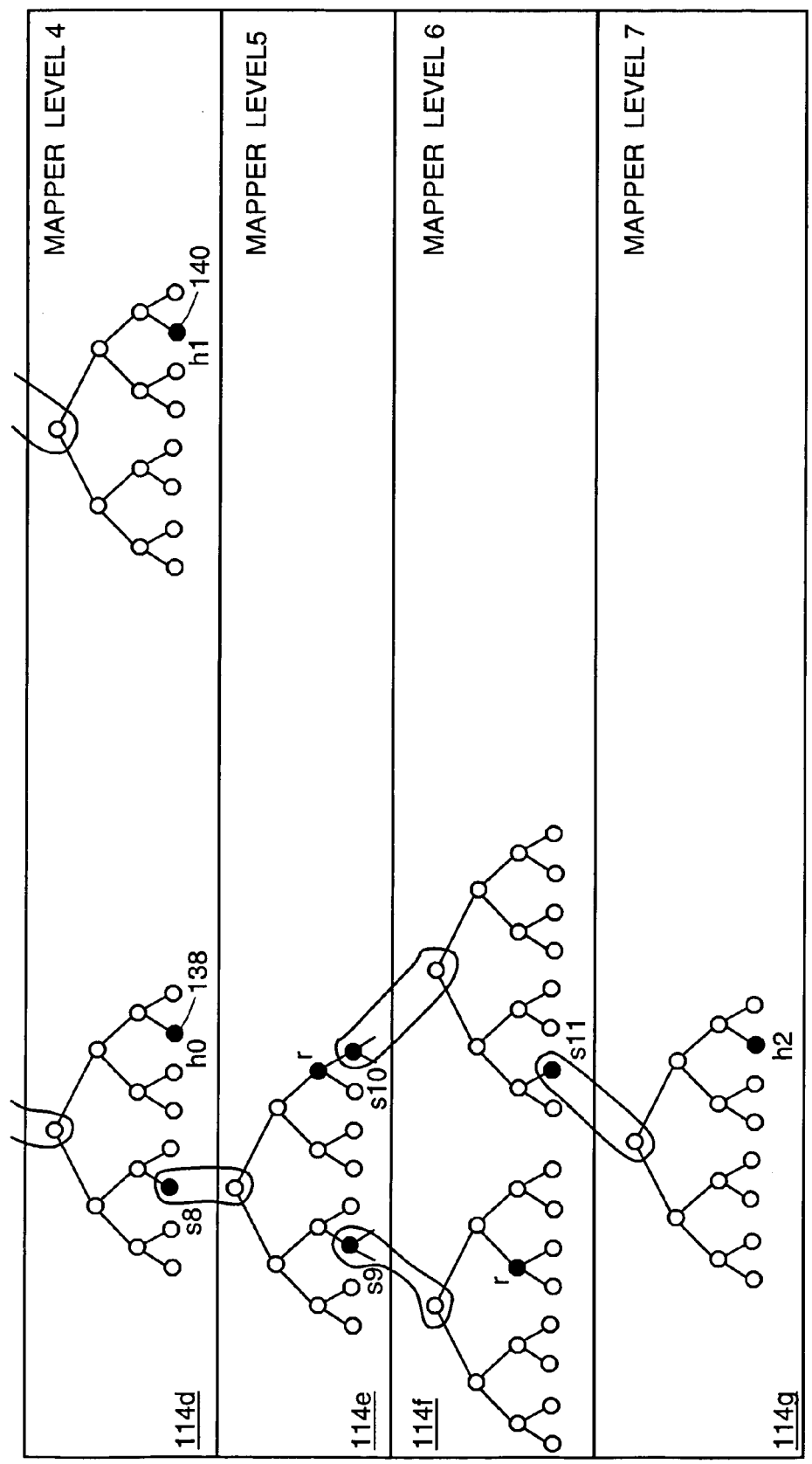

FIG. 3A illustrates a 64-level binary tree representation of the entries stored in the lookup unit matrix 100 shown in FIG. 2. The 64-bit binary tree representation is used to illustrate physical expansion of a lookup unit. A lookup unit is expanded by combining a plurality of lookup units 150*a*, 150*b* in a lookup unit matrix 100. The lookup unit matrix 100 stores a value corresponding to a search key 104 (FIG. 2) that is longer than the mapper key 104*a*, 104*b* (FIG. 2). In the embodiment shown, the search key 104 (FIG. 2) is 64-bits long, mapper key 104*a*, is 40-bits long and mapper key 104*b* is 24-bits long; however, the invention is not limited to this configuration.

The 64-bit key can be represented as a 64-level binary tree. A search for an entry corresponding to a 64-bit key requires 64 searches to search bit by bit down to 64 levels. To reduce the number of searches, the 64 levels of the binary tree are divided into mapper levels 114*a-g*. Mapper level_1 114*a* includes the first 16 of the 64 levels of the binary tree. However, for simplicity only 5 of the 16 levels are shown. Mapper level_2 114*b* includes the next 8 levels of the 64-level binary tree, with three of the eight levels shown. Mapper level_3 includes the next 8 levels of the 64-level binary tree, with three of the eight levels shown. Each of mapper levels_4-7 also includes 8 levels of the 64-level binary tree with three of the eight levels shown. Master lookup unit 150*a* (FIG. 2) includes mapper levels_1-4 and non-master lookup unit 150*b*, (FIG. 2) includes mapper-levels_5-7. Each mapper level 114*a-g* includes a plurality of nodes. Dividing the 64-levels such that 16-levels (16-MSBs) of the search key 104 (FIG. 2)) are in mapper level_1 114*a* and 8-levels in mapper levels 114*b-g* appears to be optimal in the current memory technology; however, the invention is not limited to this configuration.

Figure 3B:
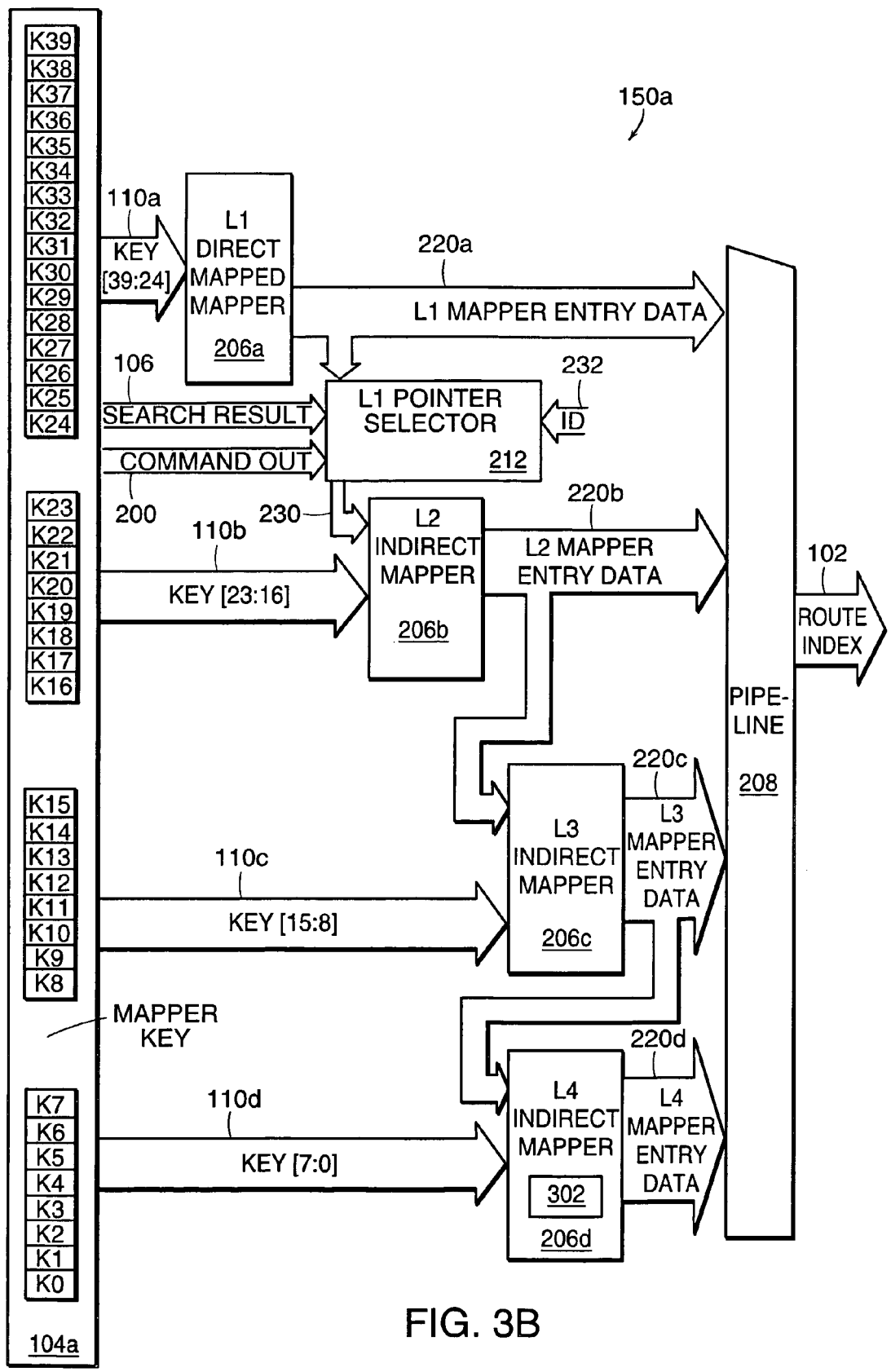
FIG. 3B illustrates the master lookup unit in the lookup unit matrix shown in FIG. 2.

FIG. 3B illustrates the master lookup unit 150*a* in the lookup unit matrix 100 shown in FIG. 2. Non-master lookup unit 150*b* differs from master lookup unit 150*a* only in state of the device identifier 232. As shown, master lookup unit 150*a* includes four mappers 206*a-d*. The route index 102 for a search key 104 is stored in a route entry 302 in one of the mappers 206*a-d*. The mapper key 104*a* is 40-bits long allowing a search for a route entry corresponding to an 8-bit prefix and a 32-bit IPv4 address stored in one of the mappers 206*a-d*. The 8-bit prefix can be a Virtual Private Network ("VPN") identifier associated with the 32-bit IPv4 address. For an IP address longer than the 32-bit IPv4 address, the 40-bit mapper key 104*a* includes the VPN and the 32 most significant bits of the IP address. Mapper 206*a* is a direct mapped mapper. Mappers 206*b-d* are indirect mappers and will be described later in conjunction with FIG. 5.

Direct mapped mapper 206*a* stores a route index 102 or a partial index for the L2 mapper 206*b* corresponding to the 16 MSBs of mapper key 104*a*. Thus, the L1 mapper 206*a* has $2^{16}$ locations, one for each of the $2^{16}$ nodes in the first mapper level 114*a* (FIG. 3A). The L1 mapper entry data 220*a* stored at the corresponding location in the L1 mapper 206*a* is forwarded to a pipeline 208 and to the L1 pointer selector 212. In the master lookup unit 150*a*, while command out 200 is set to "search", the L1 pointer selector 212 forwards the L1 mapper entry data 220*a* to the L2 mapper 206*b* dependent on the state of the device identifier 232. If the L1 mapper entry data 220*a* indicates that a search of the next level is required using the next eight bits of mapper key 110*b*, a search is performed in the L2 indirect mapper 206*b* dependent on the next eight bits of the mapper key 110b, and the L1 mapper entry data 220a forwarded by the L1 pointer selector 212.

The result of the second level search in L2 indirect mapper 206b is forwarded on L2 entry data 220b to the pipeline 208 and to the L3 indirect mapper 206c. A third level search is performed in the L3 indirect mapper 206c dependent on the next eight bits of the mapper key 110c and the L2 mapper entry data 220b.

The result of the search of the L3 indirect mapper 206c is forwarded on L3 mapper entry data 220c to the pipeline 208 and to the L4 indirect mapper 206d. The L3 mapper entry data 220c determines if a fourth level search must be performed in the L4 indirect mapper 206d dependent on the last eight bits of the key 110d and the result of the search of the L3 indirect mapper 206c forwarded as L3 mapper entry data 220c.

The result of the fourth level search is provided on L4 mapper entry data 220d. If the route index 102 associated with the longest prefix match for search key 104 is stored in master lookup unit 150a, it is stored in only one location in one of the mappers 206a-d and forwarded to the pipeline 208. If the route index 102 is found in one of the mappers 206a-d, for example, mapper 206b a search of the remaining mappers 206c-d is not necessary and mappers 206c-d are not accessed. The pipeline 208 selects the route index 102 included in one of the mapper entry data 220a-d. For example, the MSB of the mapper entry data 220a-d can provide an indication of whether a route index 102 is included.

By using a pipeline 208 in conjunction with the mappers 206a-d, multiple searches of a lookup unit 150a 150b with different values of mapper keys 104a can be performed in parallel. The pipeline 208 allows multiple searches of the lookup unit 150a, 150b to take place in parallel by storing the mapper entry data 220a-d for each mapper 206a-d associated with the 40-bit mapper key 104a until a search of each of the other mappers 206a-d has been completed, if required, to find route index corresponding to the 40-bit mapper key 104a.

Instead of performing 16 separate bit by bit searches for the first 16 bits of the search key 104 the mapper 206a is directly indexed with the first 16-MSBs of the search key 104. A search of mapper 206a in master lookup unit 150a is only performed for the first 16 bits of the search key 104. Mapper 206a in non-master lookup unit 150b is not used and thus it is not searched.

Returning to FIG. 3A, the nodes or leaves shown in mapper level_1 114a include two routes 118, 116 labeled r0 and r1 respectively and two pointers to mapper level_2 114b $130^4$ and $130^{23}$ labeled s0 and s1, respectively. A route index 102 for each route 118, 116 is stored in the L1 mapper 206a (FIG. 3B). Also, an address pointer for L2 mapper 206b (FIG. 3B) is stored in the L1 mapper 206a (FIG. 3B) for subtree index $130^4$ and subtree index $130^{23}$. An address pointer stored for subtree index $130^4$, in L1 mapper 206a (FIG. 3B) indicates that a search of the next level is required in order to find a route index 102 associated with the mapper key 104a.

The value of any node in the tree can be determined by tracing a path from the root 118. Each node in the binary tree is shown with two children, a right child and a left child. The right child is chosen if the parent node is '1.' The left child is chosen if the parent node is '0'. Tracing the path from the root 118 to node 116, r1 is stored as the route index 102 in the L1 mapper 206a (FIG. 3B) for all keys with MSBs set to '010'. Tracing the path from the root node 118 to s0 node 1304, s0 is stored in the L1 mapper 206a (FIG. 3B) for all keys with MSBs set to '00011'.

The L1 mapper 206a (FIG. 3B) is a direct mapped mapper and stores a route index 102 for each bottom-level node or leaf in the bottom level of mapper level_1 114a. The bottom level of mapper level_1 114a is the sixteenth level of the 64-level binary tree. The sixteenth level has 216 nodes. However, for illustrative purposes level-5 of the 64-level binary tree is shown as the bottom level of mapper level_1 114a. The route indexes 102 shown in the L1 mapper 206a (FIG. 3B) correspond to level_5 $130^1$-$130^{32}$ nodes of mapper level_1 114a. Tracing the path from the root node 118 to level_5 nodes $130^1$, $130^2$, $130^3$ the route index 102 is r0. Thus r0 is stored at index 00000, 00001, and 00010 in L1 mapper 206a. Node $130^4$ stores a subtree index s0, thus s0 is stored in the L1 mapper 206a at index 00011. Similarly the route index 102 for level_5 nodes $130^5$-$130^8$ is r0 thus locations at indexes 00100, 00101, 00110, and 00111 in the L1 mapper 206a (FIG. 3B) store r0. The route index 102 for level_5 nodes $130^9$-$130^{12}$ is r1, thus locations at indexes 01000, 01001, 01010 and 01011 in the L1 mapper 206a (FIG. 3B) store r1.

Each location in the L1 mapper 206a (FIG. 3B) stores a route index 102 assigned to the level_5 node $300^1$-$300^{32}$ directly or through a parent of the level-5 node $300^{1-32}$ or an address pointer to the next mapper 206b (FIG. 3B). Mapper level_4 114d includes two host nodes h0 at node 138 and h1 at node 140. A search for a host node requires a search of all bits of the search key 104. The route index 102 for h0 is stored in L4_mapper 206d (FIG. 3B). Unlike the L1 mapper 206a (FIG. 3B), the L2 mapper 206b (FIG. 3B), L3 mapper 206c (FIG. 3B) and L4 mapper 206d (FIG. 3B) are not directly mapped.

Returning to FIG. 3B, seven search levels are required to search for the route index 102 corresponding to host node h2 in mapper level_7 114g. However, each lookup unit 150a, 150b only includes four mappers 206a-d. Thus, if a search of nodes in levels 1-4 114a-d in mappers 206a-d in master lookup unit 150a does not result in a route index, a further search for a route entry or subtree entry for mapper level_5 114e (FIG. 3A) stored in L2 mapper 206b in non-master lookup unit 150b (FIG. 2) is performed with the next portion of the search key 104 and the result of the search in master lookup unit 150a. L1 pointer selector 212 determines whether the search of mapper 206b in non-master lookup unit 150b (FIG. 2) is being performed for a node in mapper level_5 114e (FIG. 3A) or a node in mapper level_2 114b (FIG. 3A) dependent on the device identifier 232 (FIG. 2).

If the search of mapper 206b in non-master lookup unit 150b (FIG. 2) is being performed for a node in mapper level_5 114e (FIG. 3A), the search result 106 from the multi-level search of master lookup unit 150a (FIG. 2) is forwarded to the L2 indirect mapper 206b in non-master lookup unit 150b (FIG. 2). The forwarding engine 108 (FIG. 2) forwards the next 24-bits of the 64-bit search key 104 as mapper key 104b (FIG. 2) to non-master lookup unit 150b.

The search continues in the L2 indirect mapper 206b in non-master lookup unit 150b. The L1 pointer selector 212 in non-master lookup unit 150b forwards the search result 106 forwarded from master lookup unit 150a to the L2 indirect mapper 206b. The L2 indirect mapper 206b in non-master lookup unit 150b searches for an entry dependent on the search result 106 and the next 8-bits of the mapper key 104b.

Subtree indexes and route indexes for level_5 114e (FIG. 3A) are stored in L2 indirect mapper 206b in non-master lookup unit 150b. Subtree indexes and route indexes for level_6 114f (FIG. 3A) are stored in L3 indirect mapper 206c in non-master lookup unit 150b and subtree indexes and route indexes for level_7 114g (FIG. 3A) are stored in L4 indirect mapper 206d in non-master lookup unit 150b.

Thus, the route index 102 for node labeled h2 in level_7 114g (FIG. 3A) is stored in L4 indirect mapper 206d in non-master lookup unit 150b. The forwarding engine 108 (FIG. 2) issues one search request to the lookup unit matrix 100. The lookup unit matrix 100 provides the route index 102 corresponding to host node h2 after a multi-level search of lookup units 150a, 150b.

Figure 4:
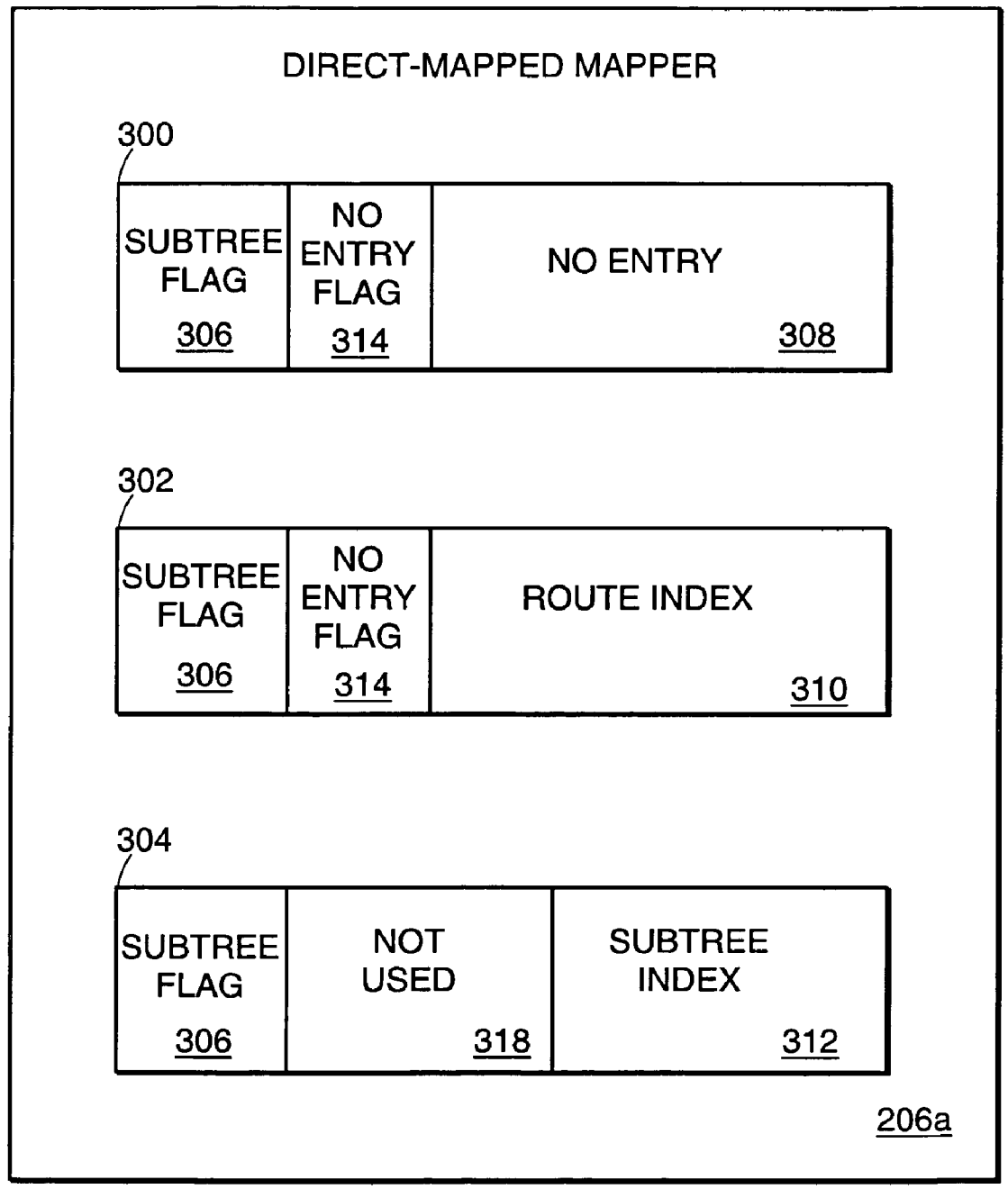
FIG. 4 illustrates the types of mapper entries which can be stored in any of the mappers in the lookup unit shown in FIG. 3B.

FIG. 4 illustrates the types of mapper entries which can be stored in any of the mappers 206a-d shown in FIG. 3B. A mapper entry for any node in the binary tree shown in FIG. 3A can store, a no-entry 300, a route entry 302 or a subtree entry descriptor 304. Each type of mapper entry 300, 302, 304 includes a subtree flag 306. The state of the subtree flag 306 indicates whether the mapper entry is a subtree entry descriptor 304. If the subtree flag 306 is set to '1', the mapper entry is a subtree entry descriptor 304 and includes a L1 mapper entry data 220a (FIG. 3B). The L1 mapper entry data 220a (FIG. 3B) is the address of the subtree entry descriptor 304 stored in the next non-direct mapped mapper 206b-d (FIG. 3B). If the subtree flag 306 is '0', the no-entry flag 314 is checked to determine if the mapper entry is a no-entry 300 or a route entry 302. If the no-entry flag 314 is '0', the entry is a no-entry 300. If the no-entry flag 314 is '1', the entry is a route entry 302 and stores the route index 102 (FIG. 2) associated with the search key 104 (FIG. 2) in the route index field 310.

Figure 5:
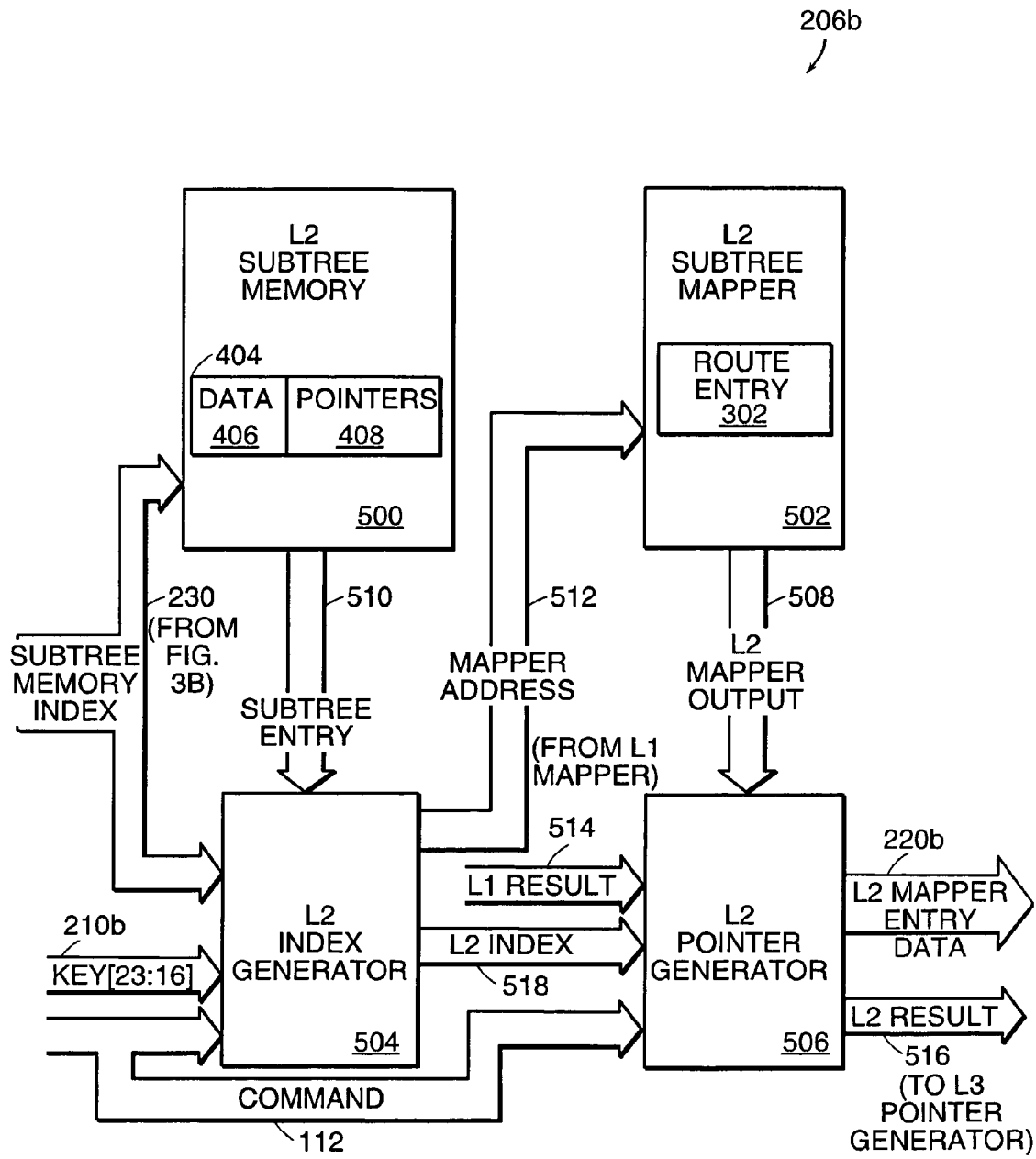
FIG. 5 illustrates one of the indirect mappers in the lookup unit shown in FIG. 3B.

FIG. 5 illustrates one of the indirect mappers 206b shown in FIG. 3B. Indirect mapper 206b in each of the lookup units 150a, 150b stores route entries 302 and subtree entry descriptors 304 corresponding to the nodes in mapper level_2 114b (FIG. 3A) and mapper level_5 114e (FIG. 3A). Mapper 206b includes a subtree memory 500, an index generator 504, a pointer selector 506 and a subtree mapper 502. In master lookup unit 150a (FIG. 2), the L1 mapper entry data 220a selected by the first portion of the mapper key 104a stored in mapper 206a (FIG. 3B) stores a partial index. The partial index is forwarded as the subtree memory index 230 to the subtree memory mapper 500. In non-master lookup unit 150b (FIG. 2), the search result 106 (FIG. 3B) from the result of searching master lookup unit 150a (FIG. 2) is forwarded as the subtree memory index 230. The subtree memory 500 includes a subtree entry 404 indexed by the subtree memory index 230. The subtree entry 404 includes a data field 406 and a pointers field 408.

Returning to FIG. 3A, the subtree entry 404 corresponds to the bottom level of one of the subtrees shown in mapper levels 114b-g. For example, if mapper level_2 114b has eight levels, the bottom level of each subtree (not shown) has a maximum of $2^8$(256) routes, one for each of the $2^8$(256) nodes.

Continuing with FIG. 5, the subtree entry 404 provides access to 256 possible mapper entries corresponding to the 256 nodes on the bottom level of the subtree. The mapper entries are stored in the subtree mapper 502. To provide access to 256 possible mapper entries, a dense subtree descriptor is stored in the data field 406. The data field 406 is 256 bits wide, providing one bit for each node at the bottom level of the subtree. A bit in the data field 406 is set to '0' if the mapper entry for the previous node is to be used and set to '1' to increment to the next mapper entry address if the next mapper entry stored in the subtree mapper 502 is to be used.

The pointers field 408 is 256 bits wide to allow for the storage of sixteen 16-bit pointers per logical row, with each pointer storing the base address for 16 contiguous mapper entries in the subtree mapper 502, to provide 256 mapper entries per logical row. Thus, the pointers field 408 can indirectly provide a pointer to a mapper entry in the subtree mapper 502 for each node in the bottom level of the subtree. The data field 406 and pointers field 418 are described in co-pending U.S. patent application Ser. No. 09/733,627 entitled "Method and Apparatus for Longest Match Address Lookup," filed Dec. 8, 2000 by David A. Brown incorporated herein by reference in its entirety.

The subtree data stored in the dense subtree descriptor in the data field 406 and the subtree pointer stored in the pointers field 408 for a selected node in the subtree are forwarded to the index generator 504. The index generator 504 also receives the next eight bits of the mapper key 110b.

The index generator 504 generates the mapper address 512 of the mapper entry associated with the node in the bottom level of the subtree dependent on the next eight bits of the mapper key 110b, and the subtree entry 510 associated with the subtree. The subtree entry 510 includes the subtree data field 406 and subtree pointers field 408 storing subtree data and subtree pointers for the subtree selected by the subtree memory index 230. The mapper address 512 indexes the mapper entry in the subtree mapper 502. The subtree mapper 502 includes the same types of mapper entries as described in conjunction with FIG. 4 for the direct mapped mapper 206a. The contents of L2 mapper entry data 220b determine whether a subsequent search of the next mapper in the lookup unit 150a, 150b (FIG. 2) is required. A subsequent search is required, if the L2 mapper entry data 220b includes a subtree entry 304, indicating that there is another subtree index 312 stored in a mapper entry in the subtree mapper 502 for the next mapper level 114c (FIG. 3A).

The next eight bits of the mapper key 110b select the node in the bottom level of the selected subtree. The subtree pointers 408 select a base address associated with the node in the subtree and the subtree data 406 selects the offset within the block of mapper entries associated with the base address.

The pointer generator 506 generates the L2 mapper entry data 220b to be forwarded to the L3 indirect mapper 206c (FIG. 3B) dependent on the L2 mapper output 508 from the subtree mapper 502, the L1 result 514 from the L1 direct mapped mapper 206a and the L2 index 518 received from the L2 index generator 504. The pointer generator 506 also generates the L2 result 516 to be forwarded to the L3 pointer generator in the next indirect mapper 206c (FIG. 3B).

Figure 6:
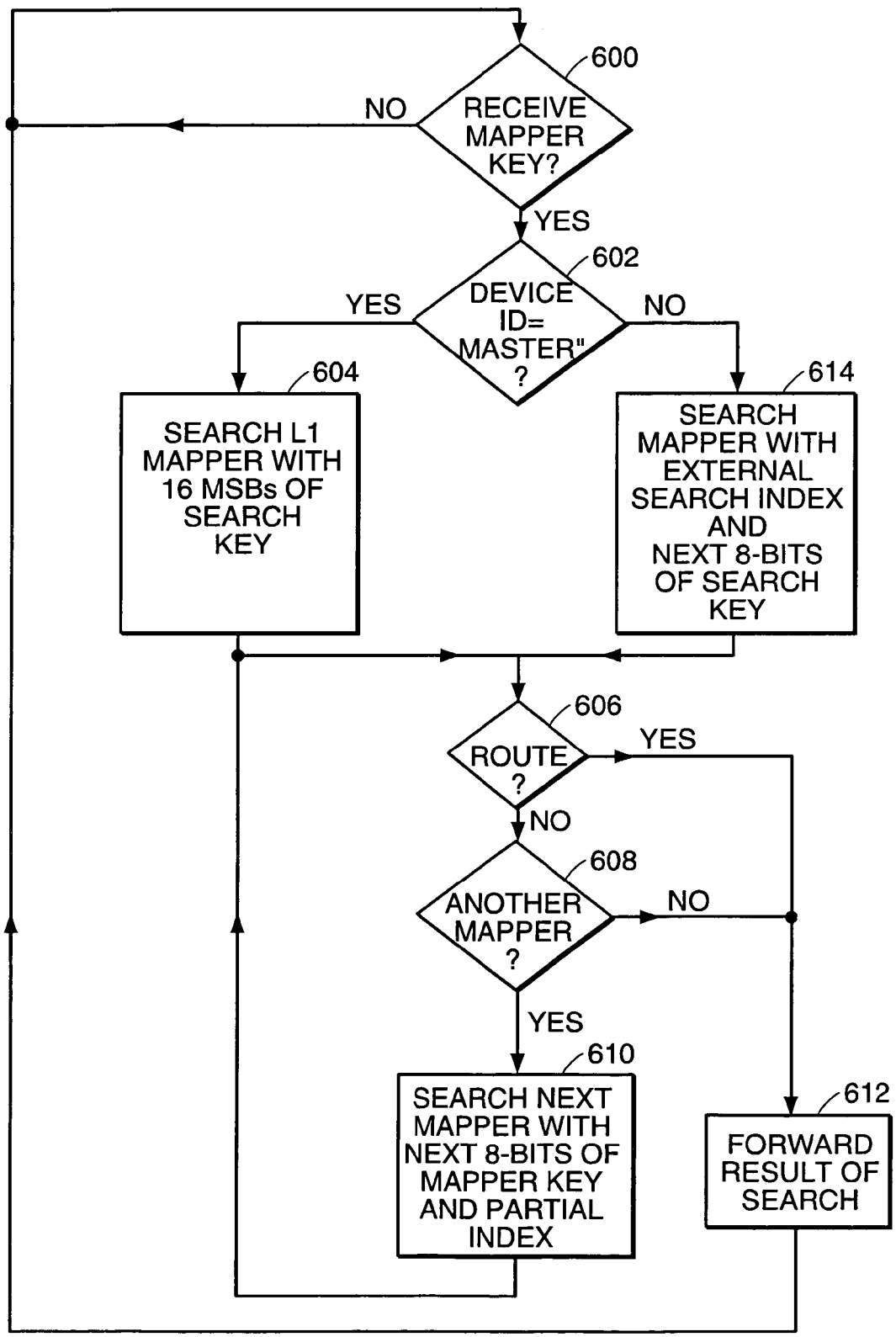
FIG. 6 is a flowchart illustrating the steps for searching for a route stored in a location.

FIG. 6 is a flowchart illustrating the steps for searching for a route index 102 (FIG. 2) corresponding to a search key 104 (FIG. 2) longer than the mapper key 104a, 104b for a lookup unit in the lookup unit matrix 100 shown in FIG. 3B. FIG. 6 is described in conjunction with FIG. 2 and FIG. 3B.

At step 600, the lookup units 150a, 150b in the lookup matrix unit 100 (FIG. 2) wait to receive a portion of a search key 104 (FIG. 2) on mapper key 104a, 104b. If a portion of search key 104 (FIG. 2) is received, processing continues with step 602.

At step 602, the lookup unit 150a, 150b (FIG. 2) examines the state of the device identifier 232 (FIG. 3B). If the device identifier 232 (FIG. 3B) is "master" and the command is "search", the search for a route index corresponding to mapper key 104a begins in L1 direct mapped mapper 206a in master lookup unit 150a (FIG. 2) and processing continues with step 604. If the device identifier 232 (FIG. 3B) is "non-master", the search begins in L2 indirect mapper 206b (FIG. 2) in non-master lookup unit 150b (FIG. 2) for a route index corresponding to mapper key 104b and the search result 106 from master lookup unit 150a and processing continues with step 614.

At step 604, master lookup unit 150a in lookup unit matrix 100 (FIG. 2) performs a search in the direct mapper 206a (FIG. 3B) for the 16-MSBs of the search key 104 (FIG. 2) forwarded as mapper key 104a. Processing continues with step 606.

At step 606, the next indirect mapper 206b-d in master lookup unit 150a or the next indirect mapper 206c-d in non-master lookup unit 150b in the lookup unit matrix 100 (FIG. 2) examines the result of the previous mapper search. If the result is a route index corresponding to the search key 104 (FIG. 2), processing continues with step 612. If not, processing continues with step 608.

At step 608, the search of the previous mappers 206a-d (FIG. 3B) in master lookup unit 150a (FIG. 3B) or mappers 206b-d in non-master lookup unit 150b did not result in a route index. The master lookup unit 150a (FIG. 3B) determines if there is another mapper 206b-d (FIG. 3B) or the non-master lookup unit 150b (FIG. 3B) determines if there is another mapper 206c-d (FIG. 3B) to which the result of the search is to be forwarded. If so, processing continues with step 610. If not, processing continues with step 612.

At step 610, if the lookup unit is the master lookup unit 150a, the next mapper 206b-d (FIG. 3B) in the master lookup unit 150a, in the lookup unit matrix 100 is searched with the result of the search in the previous mapper 206a-c (FIG. 3B) and the respective next 8-bits of the mapper key 110b, 110c or 110d. Alternately, if the lookup unit is the non-master lookup unit 150b, lookup unit 150b in the lookup unit matrix 100 is searched with the result of the search in the previous mapper 206b-c (FIG. 3B) and the respective next 8-bits of the mapper key 110c or 110d. Processing continues with step 606.

At step 612, the result of the multi-level search in the respective lookup unit 150a, 150b (FIG. 3B) is forwarded from the lookup unit matrix 100 (FIG. 2) to the forwarding engine 108 (FIG. 2) as the route index 102 (FIG. 2). Processing returns to step 600 to wait to receive another mapper key 104a, 104b (FIG. 2) from the forwarding engine 108 (FIG. 2).

At step 614, in a subsequent search for mapper key 104b in non-master lookup unit 150b (FIG. 2), a search is performed for the next 24-bits of the search key 104 in the second mapper 206b (FIG. 3B) with the first 8-bits of the mapper key 110b and the search result 106 (FIG. 3B) from the search of master lookup unit 150a. Processing continues with step 606 to examine the result of the search in mapper 206b.

The lookup unit matrix can provide route indexes corresponding to a search key that is longer than the lookup unit's mapper key by performing searches of a plurality of lookup units in the lookup unit matrix 100. The same lookup unit matrix can provide a route index for an IPv4 address in a single search cycle of a master lookup unit 150a and a route index for an IPv6 address in a search of lookup unit matrix 100 including a plurality of lookup units 150a, 150b.

A lookup unit can be used to store routes for IPv4 address which are searchable in a single search cycle of the lookup unit. A plurality of lookup units can be combined in a lookup unit matrix to store routes for search keys longer than the lookup unit's mapper key.

While this invention has been particularly shown and described with references to preferred embodiments thereof, it will be understood by those skilled in the art that various changes in form and details may be made therein without departing from the scope of the invention encompassed by the appended claims.

What is claimed is:

1. A system comprising:
 a master lookup unit comprising a direct mapper and at least one indirect mapper, wherein the direct mapper is configured to return one of a route index or a partial index in response to a search for at least a first portion of an initial mapper key comprising at least a first portion of a search key, and wherein the at least one indirect mapper is configured to return one of a route index or a partial index in response to a search for at least a corresponding subsequent portion of the initial mapper key and a partial index returned by one of either the direct mapper or another indirect mapper; and
 one or more non-master lookup units configured to return at least one of a route index or a partial index in response to a search for a subsequent mapper key comprising a corresponding subsequent portion of the search key and a partial index returned by one of either the master lookup unit or another non-master lookup unit.

2. The system of claim 1, wherein at least one non-master lookup unit comprises at least one indirect mapper configured to return one of a route index or a partial index in response to a search for at least a portion of the subsequent mapper key and a partial index returned by one of either the master lookup unit or another indirect mapper of the at least one non-master lookup unit or at least one other non-master lookup unit.

3. The system of claim 1, wherein the master lookup unit is configured to return a route index when the search key corresponds to a 32-bit Internet Protocol address.

4. The system of claim 1, wherein the master lookup unit is configured to return a partial index for use by a non-master lookup unit when the search key corresponds to a 128-bit Internet Protocol address.

5. The system of claim 1, further comprising:
 a forwarding engine configured to receive the search key, divide the search key into the initial mapper key and one or more subsequent mapper keys, submit the initial mapper key to the master lookup unit, and submit each subsequent mapper key to a corresponding non-master lookup unit.

6. A method comprising:
 receiving an initial mapper key at a master lookup unit comprising a direct mapper and at least one indirect mapper, wherein the initial mapper key comprises at least a first portion of a search key;
 searching for at least a first portion of the initial mapper key in the direct mapper, and
  returning a route index in response to the search for the at least first portion of the initial mapper key resulting in the route index, and
  searching the at least one indirect mapper for a key comprising a partial index and a corresponding subsequent portion of the initial mapper key in response to the search for the at least first portion of the initial mapper key resulting in the partial index; and
 receiving a subsequent mapper key at a non-master lookup unit, wherein the subsequent mapper key comprises a corresponding subsequent portion of the search key and a partial index received from one of the master lookup unit or another non-master lookup unit; and
 returning one of a route index or a partial index in response to a search for the subsequent mapper key in the non-master lookup unit.

7. The method of claim 6, further comprising:
 dividing the search key into the initial mapper key and one or more subsequent mapper keys;
 sending the initial mapper key to the master lookup unit; and
 sending each of the one or more subsequent mapper keys to a corresponding non-master lookup unit.

8. The method of claim 6, wherein the non-master lookup unit comprises at least one indirect mapper, and wherein returning one of a route index or a partial index in response to a search for the subsequent mapper key in the non-master lookup unit comprises:
 searching for at least a first portion of the subsequent mapper key in the at least one indirect mapper of the non-master lookup unit; and
 returning the route index in response to the search for the at least first portion of the subsequent mapper key resulting in the route index; and
 searching at least one subsequent indirect mapper for a key comprising the partial index and a corresponding subsequent portion of the subsequent mapper key in response to the search for the at least first portion of the subsequent mapper key resulting in the partial index.

9. The method of claim 6, wherein the search key corresponds to a 32-bit Internet Protocol address.

10. The method of claim 6, wherein the search key corresponds to a 128-bit Internet Protocol address.

11. An apparatus comprising:
means for returning one of a route index or a partial index in response to a search for an initial mapper key comprising at least a first portion of a search key, wherein the means for returning one of a route index or a partial index in response to a search for an initial mapper key comprises a direct mapper and at least one indirect mapper, wherein the direct mapper is configured to return one of a route index or a partial index in response to a search for at least a first portion of the initial mapper key, and wherein the at least one indirect mapper is configured to return one of a route index or a partial index in response to a search for at least a second portion of the initial mapper key and a partial index returned by the direct mapper; and
means for returning one of a route index or a partial index in response to a search for a subsequent mapper key comprising a corresponding subsequent portion of the search key and a partial index returned by one of either the means for returning one of a route index or a partial index in response to a search for an initial mapper key or another means for returning one of a route index or a partial index in response to a search for a subsequent mapper key.

12. The apparatus of claim 11, further comprising:
means for dividing the search key into an initial mapper key and one or more subsequent mapper keys.

13. The apparatus of claim 11, wherein the means for returning one of a route index or a partial index in response to a search for a subsequent mapper key comprises:
a first indirect mapper configured to return one of a route index or a partial index in response to a search for at least a first portion of the subsequent mapper key and a partial index returned by the means for returning one of a route index or a partial index in response to a search for an initial mapper key; and
at least one subsequent indirect mapper configured to return one of a route index or a partial index in response to a search for at least a subsequent portion of the subsequent mapper key and a partial index returned by the first indirect mapper.

14. The apparatus of claim 11, wherein the search key corresponds to a 32-bit Internet Protocol address.

15. The apparatus of claim 11, wherein the search key corresponds to a 128-bit Internet Protocol address.

16. A system comprising:
a master lookup unit configured to return one of a route index or a partial index in response to a search for an initial mapper key, the initial mapper key comprising at least a first portion of a search key, wherein the master lookup unit comprises a direct mapper and at least one indirect mapper; and
one or more non-master lookup units configured to return at least one of a route index or a partial index in response to a search for a subsequent mapper key comprising a corresponding subsequent portion of the search key and a partial index returned by one of either the master lookup unit or another non-master lookup unit, wherein at least one non-master lookup unit comprises at least one indirect mapper configured to return one of a route index or a partial index in response to a search for at least a portion of the subsequent mapper key and a partial index returned by one of either the master lookup unit or another indirect mapper of the at least one non-master lookup unit or at least one other non-master lookup unit.

17. A method comprising:
receiving an initial mapper key at a master lookup unit comprising a direct mapper and at least one indirect mapper, wherein the initial mapper key comprises at least a first portion of a search key;
returning one of a route index or a partial index in response to a search for the initial mapper key in the master lookup unit;
receiving a subsequent mapper key at a non-master lookup unit comprising at least one indirect mapper, wherein the subsequent mapper key comprises a corresponding subsequent portion of the search key and a partial index received from one of the master lookup unit or another non-master lookup unit;
searching for at least a first portion of the subsequent mapper key in the at least one indirect mapper of the non-master lookup unit;
in response to the search for the at least first portion of the subsequent mapper key resulting in a route index, returning the resulting route index; and
in response to the search for the at least first portion of the subsequent mapper key resulting in a partial index, searching at least one subsequent indirect mapper for a key comprising the resulting partial index and a corresponding subsequent portion of the subsequent mapper key.

18. An apparatus comprising:
means for returning one of a route index or a partial index in response to a search for an initial mapper key comprising at least a first portion of a search key, wherein the means for returning one of a route index or a partial index in response to a search for an initial mapper key comprises a direct mapper and at least one indirect mapper; and
means for returning one of a route index or a partial index in response to a search for a subsequent mapper key comprising a corresponding subsequent portion of the search key and a partial index returned by one of either the means for returning one of a route index or a partial index in response to a search for an initial mapper key or another means for returning one of a route index or a partial index in response to a search for a subsequent mapper key, wherein the means for returning one of a route index or a partial index in response to a search for a subsequent mapper key comprises:
a first indirect mapper configured to return one of a route index or a partial index in response to a search for at least a first portion of the subsequent mapper key and a partial index returned by the means for returning one of a route index or a partial index in response to a search for an initial mapper key; and
at least one subsequent indirect mapper configured to return one of a route index or a partial index in response to a search for at least a subsequent portion of the subsequent mapper key and a partial index returned by the first indirect mapper.

* * * * *